United States Patent
Suzuki

(10) Patent No.: US 6,408,192 B1
(45) Date of Patent: Jun. 18, 2002

(54) RADIO SELECTIVE CALL RECEIVING DEVICE CAPABLE OF INCREASING OPERABILITY

(75) Inventor: Katsuroh Suzuki, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/368,127

(22) Filed: Aug. 4, 1999

(30) Foreign Application Priority Data

Aug. 13, 1998 (JP) ........................................... 10-228984

(51) Int. Cl.[7] ................................................ H04B 1/38
(52) U.S. Cl. ...................... 455/566; 340/7.55; 340/7.61
(58) Field of Search ............................... 340/7.55, 7.61; 455/566, 186.1; 345/123, 124

(56) References Cited

U.S. PATENT DOCUMENTS 4,952,927 A * 8/1990 DeLuca et al. ......... 340/825.44

FOREIGN PATENT DOCUMENTS

| JP | 2-132927 | 5/1990 |
| JP | 7-240953 | 9/1995 |
| JP | 9-37323 | 2/1997 |
| JP | 10-13314 | 1/1998 |
| JP | 10-13881 | 1/1998 |

* cited by examiner

Primary Examiner—Lee Nguyen
(74) Attorney, Agent, or Firm—Scully, Scott, Murphy & Presser

(57) ABSTRACT

In a radio select call receiving device, a memorizing device memorizes a message data from a message receiving device. A displaying device displays the message data which are memorized in the memorizing device when the displaying device is supplied with a message display indicating signal. A message memory controlling device controls the memorizing device so that the message memory controlling device makes the memorizing device memorize plural message data, as plural associated message data, when the message memory controlling device is supplied with the plural message data which are associated. A display controlling device controls the displaying device so that the display controlling device makes the displaying device, in a scroll fashion and at a scroll speed, display the plural associated message data in response to a timed value. A time controlling device times a message data displaying time of the displaying device to produce and supply the timed value to the display controlling device.

2 Claims, 4 Drawing Sheets

FIG. 3

| MEMORY CONTROLLING NUMBER | DIRECTORY DATA | | | MESSAGE DATA |
|---|---|---|---|---|
| | FRONT DIRECTION DATA | BACK DIRECTION DATA | CONTINUATION DATA | |
| 0 | 2 | END | END | SEPARATE MESSAGE DATA 0 |
| 1 | END | 4 | 6 | PLURAL MESSAGE DATA 1-0 |
| 2 | 4 | 0 | END | SEPARATE MESSAGE DATA 1 |
| 3 | 1 | | END | PLURAL MESSAGE DATA 0-1 |
| 4 | | 2 | 5 | PLURAL MESSAGE DATA 0-0 |
| 5 | | | NEXT | PLURAL MESSAGE DATA PRODUCING 1 |
| 6 | | | END | PLURAL MESSAGE DATA 1-1 |
| 7 | | | 5 | PLURAL MESSAGE DATA PRODUCING 0 |
| 8 | 9 | END | | FREE MEMORY 0 |
| 9 | END | 8 | | FREE MEMORY 1 |

31 ↝

17 ↝

| 32 | ALL MESSAGE HEAD NUMBER MEMORY | 0 |
| 33 | PLURAL MESSAGE PRODUCING PERIOD NUMBER MEMORY | 7 |
| 34 | FREE MEMORY HEAD NUMBER MEMORY | 8 |

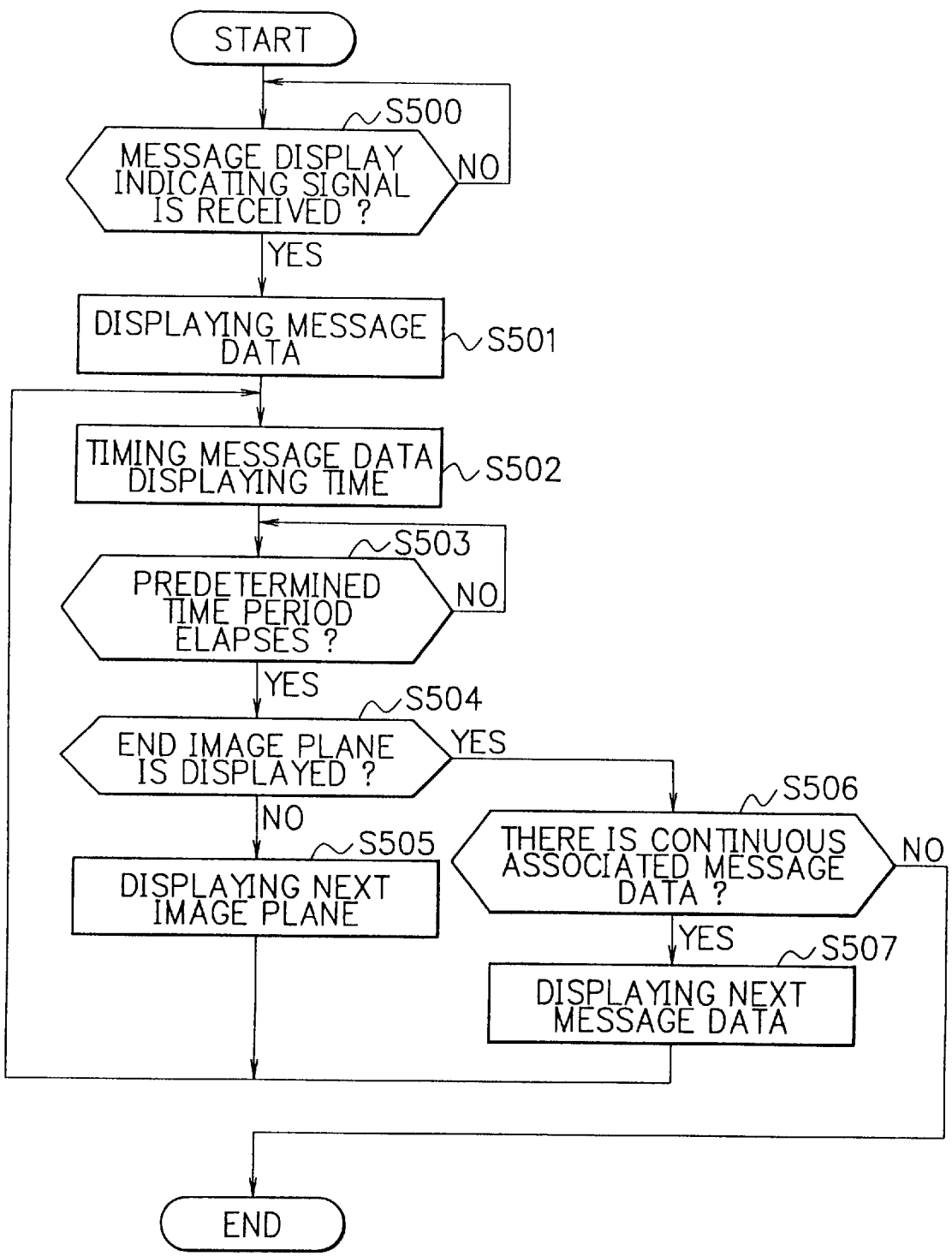

RADIO SELECTIVE CALL RECEIVING DEVICE CAPABLE OF INCREASING OPERABILITY

BACKGROUND OF THE INVENTION

This invention relates to a radio select call receiving device for displaying message data which are received.

Description of the Related Art

First, second, and third conventional radio select call receiving devices are disclosed in Japanese Unexamined Patent Publications (Koukai) No. 13881/1998, No. 37323/1997, and No. 132927/1990.

The first conventional radio select call receiving device of Japanese Unexamined Patent Publication (koukai) No. 13881/1998 comprises a message displaying device for collectively displaying plural of message data. The second conventional radio select call receiving device of Japanese Unexamined Patent Publication (koukai) No. 37323/1997 comprises a message displaying device for, in a scroll fashion and at a interval of addresses, displaying a message data in response to a scroll indicating signal from a scroll indicating switch. The third conventional radio select call receiving device of Japanese Unexamined Patent Publication (koukai) No. 132927/1990 comprises a message displaying device for, in a scroll fashion, displaying a message data in response to a sensing signal from a sensor.

However, in the first conventional radio select call receiving device, there is a problem that the message displaying device is not capable of collectively displaying all of the plural message data when amount of the plural message data is great. Also, in the second conventional radio select call receiving device, there is a problem that it needs to operate the scroll indicating switch in response to each of message data when the message displaying device displays the plural message data. In addition, in each of the second and third conventional radio select call receiving devices, there is a problem that it is impossible to memorize the plural message data, as associated message data, when each of the second and third conventional radio select call receiving devices is supplied with the plural message data which are associated and that it is impossible to display the plural message data, as the plural associated message data.

SUMMARY OF THE INVENTION

It is therefore an object of this invention to provide a radio select call receiving device which is capable of increasing operability.

It is another object of this invention to provide a radio select call receiving device which is capable of displaying all of the plural message data even when amount of the plural message data is great.

It is another object of this invention to provide a radio select call receiving device which is capable of memorizing plural message data, as plural associated message data, when the conventional radio select call receiving device is supplied with the plural message data which are associated and of displaying the plural message data, as the plural associated message data.

Other objects of this invention will become clear as the description proceeds.

According to a first aspect of this invention, there is provided a radio select call receiving device comprising:

message receiving means for receiving message data of a self call number;

message memorizing means for memorizing the message data;

message displaying means for displaying the message data which are memorized in the message memorizing means when the message displaying means is supplied with a message display indicating signal;

message memory controlling means for controlling the message memorizing means so that the message memory controlling means makes the message memorizing means memorize plural message data, as plural associated message data, when the message memory controlling means is supplied with the plural message data which are associated;

display controlling means for controlling the message displaying means so that the display controlling means makes the message displaying means, in a scroll fashion and at a scroll speed, display the plural associated message data in response to a timed value; and time controlling means for timing a message data displaying time of the message displaying means to produce and supply the timed value to the display controlling means.

According to a second aspect of this invention, there is provided a radio select call receiving device comprising:

message receiving means for receiving message data of a self call number;

message memorizing means for memorizing the message data;

message displaying means for displaying the message data which are memorized in the message memorizing means when the message displaying means is supplied with a message display indicating signal;

message memory controlling means for controlling the message memorizing means so that the message memory controlling means makes the message memorizing means memorize plural message data, as plural associated message data, when the message memory controlling means is supplied with the plural message data which are associated;

display controlling means for controlling the message displaying means so that the display controlling means makes the message displaying means, in a scroll fashion and at a scroll speed, display the plural associated message data in response to a timed value:

time controlling means for timing a message data displaying time of the message displaying means to produce and supply the timed value to the display controlling means; and scroll speed indicating means for indicating the scroll speed in each of the message data.

According to a third aspect of this invention, there is provided a method of controlling a radio select call receiving device, comprising:

a message receiving step of receiving message data of a self call number;

a message memorizing step of memorizing, by message memorizing means, the message data;

a message displaying step of displaying, by message displaying means, the message data which are memorized in the message memorizing means when the message displaying means is supplied with a message display indicating signal;

a message memory controlling step of controlling, by message memory controlling means, the message memorizing means so that the message memory controlling means makes the message memorizing means memorize plural message data, as plural associated message data, when the message memory controlling means is supplied with the plural message data which are associated;

a display controlling step of controlling, by display controlling means, the message displaying means so that the display controlling means makes the message displaying means, in a scroll fashion and at a scroll speed, display the plural associated message data in response to a timed value; and a time controlling step of timing, time controlling means, a message data displaying time of the message displaying means to produce and supply the timed value to the display controlling means.

According to a fourth aspect of this invention, there is provided a method of controlling a radio select call receiving device, comprising:

a message receiving step of receiving message data of a self call number;

a message memorizing step of memorizing, by message memorizing means, the message data;

a message displaying step of displaying, by message displaying means, the message data which are memorized in the message memorizing means when the message displaying means is supplied with a message display indicating signal;

a message memory controlling step of controlling, by message memory controlling means, the message memorizing means so that the message memory controlling means makes the message memorizing means memorize plural message data, as plural associated message data, when the message memory controlling means is supplied with the plural message data which are associated;

a display controlling step of controlling, by display controlling means, the message displaying means so that the display controlling means makes the message displaying means, in a scroll fashion and at a scroll speed, display the plural associated message data in response to a timed value;

a time controlling step of timing, time controlling means, a message data displaying time of the message displaying means to produce and supply the timed value to the display controlling means; and scroll speed indicating step of indicating, by scroll speed indicating means, the scroll speed in each of the message data.

BRIEF DESCRIPTION OF THE DRAWINGS

FIG. 3 a view for use in describing a memorizing device of the radio select call receiving device illustrated in FIG. 1;

FIG. 5 is a flow chart for use in describing another operation of the radio select call receiving device illustrated in FIG. 1.

DESCRIPTION OF THE PREFERRED EMBODIMENTS

Figure 1:
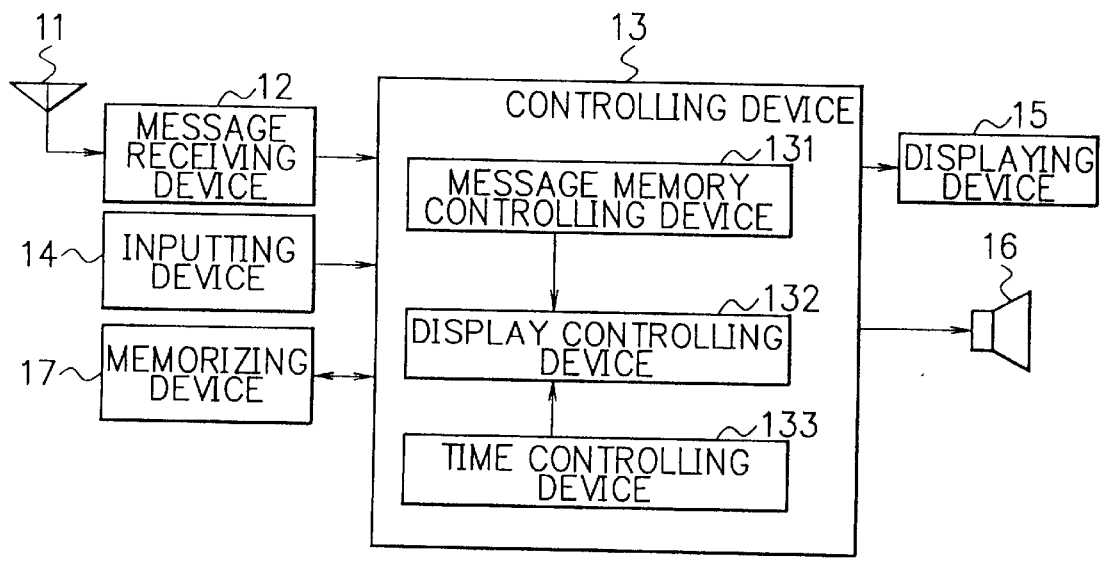
FIG. 1 is a block diagram of a radio select call receiving device according to a first embodiment of this invention.

Referring to FIG. 1, a radio select call receiving device according to an embodiment of this invention comprises an antenna 11, a message receiving device 12, a controlling device 13, an inputting device 14, a displaying device 15, an annunciator 16, and a memorizing device 17. The message receiving device 12 is connected to the antenna 11. The controlling device 13 is connected to the message receiving device 12, the inputting device 14, the displaying device 15, the annunciator 16, and the memorizing device 17.

The antenna 11 is supplied with a self call signal and a message data of a self call number that are transmitted from a base station (not shown). The antenna 11 supplies the self call signal and the message data of the self call number to the message receiving device 12. The message receiving device 12 is supplied with the self call signal and the message data from the antenna 11 and supplies the self call signal and the message data to the controlling device 13. The controlling device 13, by a program, controls the message receiving device 12, the inputting device 14, the displaying device 15, the annunciator 16, and the memorizing device 17. The inputting device 14 is for inputting such as a message display indicating signal.

The displaying device 15 displays such as the message data and menu data. The annunciator 16 is supplied with the self call signal from the controlling device 13 and produces an annunciation sound. The memorizing device 17 is supplied with the message data from the controlling device 13 and memorizes the message data.

The controlling device 13 comprises a message memory controlling device 131, a display controlling device 132, and a time controlling device 133. The display controlling device 132 is connected to the message memory controlling device 131 and to the time controlling device 133. The message memory controlling device 131 is supplied with the message data from the message receiving device 12. The message memory controlling device 131 makes the memorizing device 17 memorize the message data. Also, the message memory controlling device 131 discriminates whether or not the message data is a separate data. Namely, the message memory controlling device 131 discriminates whether or not the message data is one of message data which are associated. In addition, the message memory controlling device 131 makes the memorizing device 17 memorize the message data when the message memory controlling device 131 is supplied with the message which is the separate data. The message memory controlling device 131 makes the memorizing device 17 memorize the message data, as an associated message data, when the message memory controlling device 131 is supplied with the message data which is the one of the plural message data, namely, the plural associated message data, which are associated.

The display controlling device 132 is supplied with the message display indicating signal from the inputting device 14 and makes the message displaying device 15, by a scroll fashion and at a scroll speed, display the message data in response to a kind of the message data. Namely, when the display controlling device 132 is supplied with the message display indicating signal, the display controlling device 132 makes the message displaying device 15, by the scroll fashion and at the scroll speed, displays the message data when the display controlling device 132 is supplied with the separate message data. Also, when the display controlling device 132 is supplied with the message display indicating signal, the display controlling device 132 makes the message displaying device 15, in the scroll fashion and at the scroll speed, display the plural associated message data when the message data are associated.

The scroll speed is indicated in each of the message data. The time controlling device 133 times a message data displaying time of the display controlling device 132 to produce and supply the timed value to the display controlling device 132. The display controlling device 132 controls the message displaying device 15 in response to each of the message data and the timed value from the time controlling device 133.

Referring to FIGS. 1, 2, 3, 4, and 5, the description will proceed to an operation of the radio select call receiving device according to the embodiment of this invention.

Figure 2:
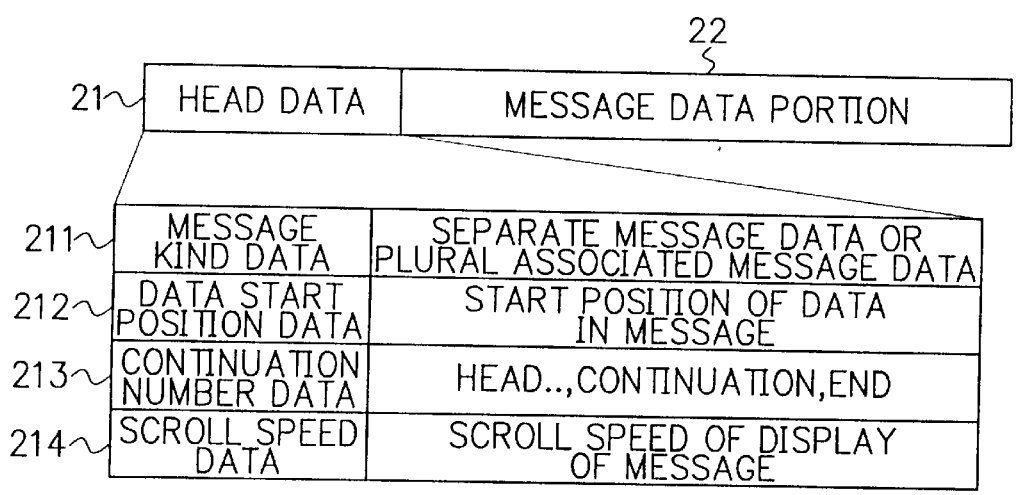
FIG. 2 is a view for use in describing a message data of the radio select call receiving device illustrated in FIG. 1.

In FIG. 2, the message data comprises a head data 21 and a message data portion 22. The head data 21 comprises a message kind data 211, a data start position data 212, a continuation number data 213, and a scroll speed data 214. The message data portion 22 is displayed, as the message data, by the message displaying device 15. The message kind data 211 is a data for discriminating whether or not the message data is the separate message data, namely, whether or not the message data is one of the plural associated message data. The message memory controlling device 131 makes the memorizing device 17 memorize the message data, as the associated message data, when the message memory controlling device 131 is supplied with the message which is the one of the plural associated message data. The display controlling device 132 makes the message displaying device 15, in the scroll fashion and at the scroll speed, display the plural associated message data when the plural message data are associated.

The data start position data 212 is a data for indicating a start position of the message data portion 22 of the message data. A portion of the message data after start position, namely, the message data portion 22 is displayed, as the message data, by the message displaying device 15. The continuation number data 213 has a number for discriminating receiving sequence of one of the plural associated message data which is received. Also, the continuation number data 213 has a data code which represents one of a head data, a continuation data, and a end data. In addition, the plural continuation number data 213 repeats continuous data codes. The message memory controlling device 131 judges, by discriminating the continuation number data 213, whether or not the message memory controlling device 131 is normally received the plural message data which are associated. The scroll speed data 214 has a data representing a scroll speed of the massage data which is received. For example, when the scroll speed data 214 has 250 msec, the message memory controlling device 131, at an interval of 250 msec, changes a display of the message data.

In FIG. 3, the memorizing device 17 comprises a message memory 31, an all message head number memory 32, a plural message producing period number memory 33, and a free memory head number memory 34. The message memory 31 memorizes message data which is received. The message memory 31 comprises unfree memories and free memories. The all message head number memory 32 memorize all of head numbers of the message data which are received. The plural message producing period number memory 33 memorizes a head number of the plural associated message data. The free memory head number memory 34 memorizes a head number of the free memory or the free memories.

The message memory 31 memorizes the message data and a directory data in each of memory controlling numbers. The message data comprises such as a receiving address and a receiving message data. The directory data comprises a front direction data, a back direction data, and a continuation data in each of the memory controlling numbers. All of the unfree memories and the free memories are associated by the front direction data and the back direction data each of which has the memory controlling number. The back direction data has the controlling number of the message data which is received once after, namely, just after. The front direction data has the controlling number of the message data which is received once before, namely, just before. Since there is not the back direction data of the newest message data, "END" is memorized in the back direction data of the newest message data. "END" represents a end of memory. Since there is not the front direction data of the oldest message data, "END" is memorized in the front direction data of the oldest message data. Similarly, the free memory is associated by the directory data. Also, the memory controlling number of a next continuous message data is memorized the continuation data when the message memory controlling device 131 is supplied with one of the plural associated message data. When there is the next continuous message data, "NEXT" is memorized the continuation data. "NEXT" represents continuation. Also, when there is not the next continuous message data, "END" is memorized the continuation data.

The all message head number memory 32 has "END" or a memory controlling number which is presently a head number in the associated memory controlling numbers. "END" represents that there is not the message data which is associated. Also, the plural message producing period number memory 33 has "END" or a memory controlling number which is presently a head number in the associated memory controlling numbers. In addition, the free memory head number memory 34 memories "END" or a memory controlling number which is presently a head number in the associated memory controlling numbers. Therefore, it is possible to read out the head message data by reading out the memory controlling number which is memorized in the all message head number memory 32, the plural message producing period number memory 33, and the free memory head number memory 34. Also, it is possible to read out the message data which is received once before by reading out the memory controlling number of the front direction data in the memory controlling number which is presently read out. In addition, it is possible to read out the message data which is received once after by reading out the memory controlling number of the back direction data in the memory controlling number which is presently read out.

The message memory controlling device 131 controls memorizing and releasing of the message data. The description will proceed to memorizing of the message data. Firstly, the message memory controlling device 131 reads out a head free memory which is indicated by the free memory head number memory 34. Next, the message memory controlling device 131 makes the head free memory memorize the new message data which is received. Next, the message memory controlling device 131 makes the free memory head number memory 34 memorizes, as a new free memory controlling head number, the memory controlling number which is the front direction data of the directory data. Next, the message memory controlling device 131 makes the front direction data of the directory data the memory controlling number which is memorized in the all message head number memory 32. The message memory controlling device 131 makes the back direction of the head free memory memorize "END". The message memory controlling device 131 makes all message head number memory 32 memorize the memory controlling number of the head free memory. Therefore, the memory controlling number of the head free memory is associated as an all message head number. Thereby, the head free memory is changed. Consequently, the message memory controlling device 131 makes the back direction of the head free memory memorize "END". Thereby, the memorizing of the message data is ended.

Also, when the free memory head number of the free memory head number memory is "END", there is not the free memory. Therefore, the message memory controlling device 131 releases the unfree memory of the message memory 31 to change the unfree memory to the free memory. In case of releasing the unfree memory, the message memory controlling device 131 makes the front direction data of the unfree memory, which is indicated by the back direction data of the unfree memory to be released, memorize the memory controlling number in the front direction data of the unfree memory to be released, Thereby, the message data in the unfree memory is released. Also, the message memory controlling device 131 makes the front direction data of the unfree memory released memorize the memory controlling number of the free memory head number memory 34. The message memory controlling device 131 makes the back direction data, of the unfree memory released, memorize "END". In addition, the message memory controlling device 131 makes the free memory head number memory 34 memorize the memory controlling number of the unfree memory released. Thereby, the message memory controlling device 131 changes the unfree memory to the free memory.

In addition, the plural message producing period number memory 33 memorizes memory controlling numbers the unfree memories which temporarily memorize the continuous associated message data which are received. The description will proceed to memorizing of the continuous associated message data. Firstly, when the message memory controlling device 131 receives a head one of the message data of the continuous associated message data, the message memory controlling device 131 makes the free memory memorize the head one of the message data of the continuous associated message data. Next, the message memory controlling device 131 makes the continuation data of the directory data memorize "NEXT".

Next, the message memory controlling device 131 makes the plural message producing period number memory 33 memorize the memory controlling number of the free memory hat is memorized in the head of the message data of the continuous associated message data. Next, when the message memory controlling device 131 receives one of the message data of the continuous associated message data, the message memory controlling device 131 makes the free memory memorize the one of the message data of the continuous associated message data. Next, the message memory controlling device 131 discriminates "NEXT" of the continuation data of the directory data and makes the continuation data of the unfree memory which corresponds to "NEXT" memorize the memory controlling number of the free memory which memorizes the one of the message data of the continuous associated message data. Next, the message memory controlling device 131 makes the continuation data of the free memory, which memorizes the one of the message data of the continuous associated message data, memorize "NEXT".

Next, when the message memory controlling device 191 receives an end one of the message data of the continuous associated message data, the message memory controlling device 131 makes the free memory memorize the end one of the message data of the continuous associated message data. Next, the message memory controlling device 131 discriminates "NEXT" of the continuation data of the directory data and makes the continuation data, of the unfree memory which corresponds to "NEXT", memorize the memory controlling number of the free memory which memorizes the end one of the message data of the continuous associated message data. Next, the message memory controlling device 131 makes the continuation data of the free memory, which memorizes the one of the message data of the continuous associated message data, memorize "END".

Here, since all of the continuous associated message data are received, the message memory controlling device 131 makes the message memory 31 memorize the all of the continuous associated message data, as the plural associated message data, as shown above. In addition, in case that the displaying device 15 displays the message data, the message memory controlling device 131, in due order of the memory controlling numbers which are indicated by the all message head number memory 32, reads out the message data to make the displaying device 15 display the message data.

Figure 4:
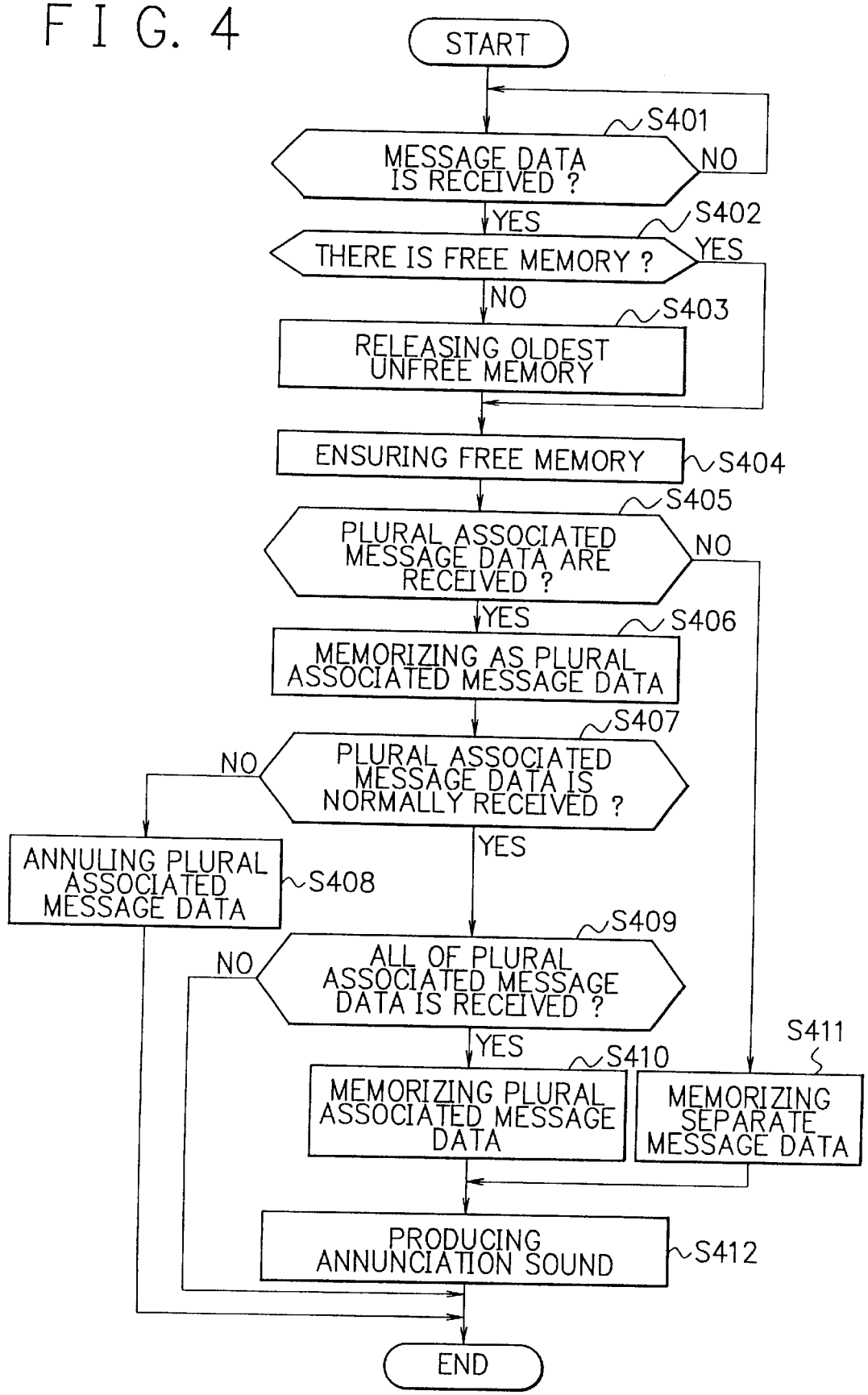
FIG. 4 is a flow chart for use in describing an operation of the radio select call receiving device illustrated in FIG. 1.

Referring to FIG. 4, the description will proceed to an operation of the controlling device 13. FIG. 4 is a flow chart for describing an operation of memorizing the message data when the controlling device 13 receives the message data. In FIG. 4, at a step S401, the controlling device 13 judges whether or not the controlling device 13 receives the message data. When the controlling device 13 receives the message data, the step S401 proceeds to a step S402. At the step S402, the controlling device 13 judges whether or not there is the free memory. In this event, the controlling device 13, by making reference to the free memory head number memory 34, judges whether or not there is "END" the free memory head number memory 34. When there is "END" in the free memory head number memory 34, the controlling device 13 judges that there is not the free memory. When there is the free memory, the step S402 proceeds to a step S403 at which the controlling device 13 releases the oldest unfree memory. Otherwise, the step S402 proceeds to a step S404. Also, the step S402 proceeds to the step S404.

At the step S404, the controlling device 13 ensures the free memory. The step S404 proceeds to a step S405 at which the controlling device 13, by making reference to the message kind data, judges whether or not the massage data is one of the plural associated message data. When the massage data is not the one of the plural associated message data, the step S405 proceeds to a step S411 at which the controlling device 13 makes the memorizing device 17 memorize the message data, as the separated message data. The step S411 proceeds to a step S412. At the step S412, the annunciator 16 produces the annunciation sound.

When, at the step S405, the massage data is the one of the plural associated message data, the step S405 proceeds to a step S406 at which the message memory controlling device 131 makes the plural message producing period number memory 33 memorize the message data as the plural message producing data. The step S406 proceeds to a step S407 at which the message memory controlling device 131, by making reference to the data continuation number data 213, judges whether or not the message memory controlling device 131 normally receives the plural associated message data. When the message memory controlling device 131 does not normally receive the plural associated message data, the step S407 proceeds to a step S408 at which the message memory controlling device 131 annuls the plural associated message data which are, by this time, received. In addition, at the step S408, the message memory controlling device 131 may give an alarm which represents that the message memory controlling device 131 does not normally receive the plural associated message data.

When, at the step S407, the message memory controlling device 131 normally receive the plural associated message data, the step S407 proceeds to a step S409. At the step S409, the message memory controlling device 131 judges whether or not the message memory controlling device 131 receives all of the plural associated message data. When the message memory controlling device 131 receives all of the plural associated message data, the step S409 proceeds to a step S410 at which the message memory controlling device 131 makes the message memory 31 memorise the all of plural associated message data. When, at the step S409, the message memory controlling device 131 does not receives all of the plural associated message data, the step S409 returns to the step S407. The step S410 proceeds to the step S412 at which the controlling makes the annunciator 16 produce the annunciation sound.

Referring to FIG. 5, the description will proceed to an operation of reading out the massage data of the memorizing device 17. In FIG. 5, at a step S500, the controlling device 13 judges whether or not the controlling device 13 receives the message display indicating signal from the inputting device 14. When the controlling device 13 receives the message display indicating signal from the inputting device 14, the step S500 proceeds to a step S501 at which the controlling device 13 reads out the message data from the memorizing device 17 and makes the displaying device 15, in the scroll fashion and at the scroll speed, display the message data which is read out. The step S501 proceeds to a step S502 at which the time controlling device 133 times the message data displaying time of the display controlling device 132 to produce and supply the time value to the display controlling device 132. The scroll speed is indicated by the scroll speed data 214 in each of the message data.

The step S502 proceeds to a step S503 at which the display controlling device 132 judges whether or not the time value is greater than a predetermined time value, namely, whether or not a predetermined time period elapses from a start of displaying the message data. When the predetermined time period elapses from the start of displaying the message data, the step S503 proceeds to a step S504. At the step S504, the display controlling device 132 judges whether or not an end image plane is displayed, namely, whether or not an end message data is displayed. When the end image plane is not displayed, the step S504 proceeds to a step S505 at which the display controlling device 132 makes the displaying device 15 display a next image plane, namely, a next message data. The step S505 returns to the step S502.

When, at the step S504, the end image plane is displayed, the step S504 proceeds to a step S506. At the step S506, the display controlling device 132, by making reference to the continuation data of the directory data, judges whether or not there is the continuous associated message data. When there is not the continuous associated message data, the operation is ended. When, at the step S506, there is the continuous associated message data, the step S506 proceeds to a step S507. At the step S507, the display controlling device 132 makes the displaying device 15 display a next message data which is a head message data of the memory controlling number represented by the continuation data of the directory data.

According to this invention, it is possible to increase operability of the radio select call receiving device.

Also, according to this invention, it is possible to display all of the plural associated message data even when amount of the plural message data is great.

In addition, according to this invention, it is possible to memorize the plural message data, as associated message data, when the radio select call receiving device is supplied with the plural message data which are associated and to display the plural data, as the plural associated data.

In addition, according to the embodiment of this invention, it is possible to indicate the scroll speed in each of the message data. Therefore, for example, in case that there are plural graphic image data, it is possible to consecutively display the plural graphic image data, as a moving picture.

What is claimed is:

1. A radio select call receiving device comprising:

message receiving means for receiving message data of a self call number;

message memorizing means for memorizing said message data;

message displaying means for displaying said message data which are memorized in said message memorizing means when said message displaying means is supplied with a message display indicating signal;

message memory controlling means for controlling said message memorizing means so that said message memory controlling means makes said message memorizing means memorize plural message data, as plural associated message data, when said message memory controlling means is supplied with said plural message data which are associated;

display controlling means for controlling said message displaying means so that said display controlling means makes said message displaying means, in a scroll fashion and at a scroll speed, display said plural associated message data in response to a timed value:

time controlling means for timing a message data displaying time of said message displaying means to produce and supply said timed value to said display controlling means; and scroll speed indicating means for indicating said scroll speed in each of said message data.

2. A method of controlling a radio select call receiving device, comprising:

a message receiving step of receiving message data of a self call number;

a message memorizing step of memorizing, by message memorizing means, said message data;

a message displaying step of displaying, by message displaying means, said message data which are memorized in said message memorizing means when said message displaying means is supplied with a message display indicating signal;

a message memory controlling step of controlling, by message memory controlling means, said message memorizing means so that said message memory controlling means makes said message memorizing means memorize plural message data, as plural associated message data, when said message memory controlling means is supplied with said plural message data which are associated;

a display controlling step of controlling, by display controlling means, said message displaying means so that said display controlling means makes said message displaying means, in a scroll fashion and at a scroll speed, display said associated message data in response to a timed value;

a time controlling step of timing, time controlling means, a message data displaying time of said message displaying means to produce and supply said timed value to said display controlling means; and a scroll speed indicating step of indicating, by scroll speed indicating means, said scroll speed in each of said message data.

* * * * *